United States Patent
Lee et al.

(10) Patent No.: US 9,008,451 B2
(45) Date of Patent: Apr. 14, 2015

(54) APPARATUS FOR ENCODING AND DECODING IMAGE AND METHOD THEREOF

(75) Inventors: Si-Hwa Lee, Seoul (KR); Doo-Hyun Kim, Seoul (KR); Hye-Yun Kim, Seongnam-si (KR); In-So Kweon, Daejeon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 962 days.

(21) Appl. No.: 11/793,147

(22) PCT Filed: Dec. 14, 2005

(86) PCT No.: PCT/KR2005/004310
§ 371 (c)(1),
(2), (4) Date: Jun. 14, 2007

(87) PCT Pub. No.: WO2006/065078
PCT Pub. Date: Jun. 22, 2006

(65) Prior Publication Data
US 2008/0131014 A1    Jun. 5, 2008

(30) Foreign Application Priority Data
Dec. 14, 2004  (KR) .......................... 10-2004-0105383

(51) Int. Cl.
G06K 9/36    (2006.01)
G06K 9/46    (2006.01)
(Continued)

(52) U.S. Cl.
CPC ............. *H04N 19/36* (2014.11); *H04N 19/124* (2014.11); *H04N 19/129* (2014.11);
(Continued)

(58) Field of Classification Search
USPC ................. 382/232, 233, 239, 246, 248, 251
See application file for complete search history.

(56) References Cited

U.S. PATENT DOCUMENTS 5,426,512 A * 6/1995 Watson .......................... 382/250
5,517,581 A   5/1996 Johnston et al.
(Continued)

FOREIGN PATENT DOCUMENTS

JP    04372074    12/1992
JP    07074954     3/1995
(Continued)

OTHER PUBLICATIONS

Kim, K.—"Color Image Quantization Using Weighted Distortion Measure of HVS Color Activity"—IEEE 1996; pp. 1035-1039.*
(Continued)

*Primary Examiner* — Bernard Krasnic
(74) *Attorney, Agent, or Firm* — Harness, Dickey & Pierce, P.L.C.

(57) ABSTRACT

An image encoding and/or decoding apparatus and method are provided. The image encoding apparatus includes: a transform unit removing spatial redundancy by transforming an original image being input; an allowable noise obtaining unit obtaining an allowable noise from the original image; a quantization parameter determination unit determining a quantization parameter by using the allowable noise; a quantization unit generating a quantized coefficient, by quantizing a transform coefficient provided from the transform unit by using the quantization parameter; and an entropy encoding unit entropy encoding the quantized coefficient to remove statistical redundancy.

7 Claims, 11 Drawing Sheets
(7 of 11 Drawing Sheet(s) Filed in Color)

(51) Int. Cl.
  G06K 9/00    (2006.01)
  H04N 19/124  (2014.01)
  H04N 19/129  (2014.01)
  H04N 19/134  (2014.01)
  H04N 19/154  (2014.01)
  H04N 19/176  (2014.01)
  H04N 19/184  (2014.01)
  H04N 19/36   (2014.01)
  H04N 19/63   (2014.01)
  H04N 19/64   (2014.01)

(52) U.S. Cl.
  CPC .......... *H04N 19/134* (2014.11); *H04N 19/154* (2014.11); *H04N 19/176* (2014.11); *H04N 19/184* (2014.11); *H04N 19/63* (2014.11); *H04N 19/647* (2014.11)

(56) References Cited

U.S. PATENT DOCUMENTS

| | | | |
|---|---|---|---|
| 5,629,780 A * | 5/1997 | Watson | 382/250 |
| 6,529,631 B1* | 3/2003 | Peterson et al. | 382/232 |
| 6,961,736 B1* | 11/2005 | Amirghodsi | 1/1 |
| 7,656,319 B2* | 2/2010 | Yu et al. | 341/52 |
| 7,751,635 B2* | 7/2010 | Clark | 382/244 |
| 2003/0215013 A1* | 11/2003 | Budnikov | 375/240.16 |
| 2004/0013312 A1* | 1/2004 | Kajiwara | 382/240 |
| 2004/0165667 A1* | 8/2004 | Lennon et al. | 375/242 |
| 2004/0196913 A1* | 10/2004 | Chakravarthy et al. | 375/254 |
| 2007/0274383 A1* | 11/2007 | Yu et al. | 375/240.11 |

FOREIGN PATENT DOCUMENTS

| | | |
|---|---|---|
| JP | 07075102 | 3/1995 |
| JP | 2000-506687 | 5/2000 |
| JP | 2003230023 | 8/2003 |
| JP | 2003248838 | 9/2003 |
| JP | 2003-284071 | 10/2003 |
| JP | 2006-509435 | 3/2006 |
| WO | 97/37322 | 10/1997 |

OTHER PUBLICATIONS

Erdan, G.—"Perceptually Based Approach to Color Quantization"—SPIE 2001, pp. 292-297.*

Bowonkoon Chitprasrt et al., "Human Visual Weighted Progressive Image Transmission", IEEE Trans. Communications, vol. 38, pp. 1040-1044, Jul. 1990.

"Video Codec for Audiovisual Services at p x 64 kbit/s", International Telecommunication Union, ITU-T Telecommunication Standardization Sector of ITU, Recommendation H.261 (03/93), Geneva 1990. pp. 1-25.

King N. Ngan et al., "Adaptive Cosine Transform Coding of Image in Perceptual Domain", IEEE Trans. Acoustics, Speech and Signal Processing, vol. 37, pp. 1743-1750, Nov. 1989.

Aleksandra Mojsilovic et al., "Color Quantization and Processing by Fibonacci Lattices", IEEE Trans. Image Processing, vol. 10, pp. 1712-1725, Nov. 2001.

Zhou Wang et al., "Universal Image Quality Index", IEEE Signal Processing Letters, vol. 9, pp. 81-84, Mar. 2002.

Kuk-Jin Yoon et al., "Human Perception Based Color Image Quantization", 17$^{th}$ International Conference on Pattern Recognition, Aug. 2004, 4 pgs.

Zhu Li et al., "Color Vector Quantization based Video Coder", IEEE International Conference on Image Processing, vol. 3, pp. 673-676, Oct. 2002.

David Taubman, "High Performance Scalable Image Compression with EBCOT", IEEE Trans. Image Processing, vol. 9, pp. 1158-1170, Jul. 2000.

PCT International Search Report issued Mar. 23, 2006 in corresponding PCT App. No. PCT/KR2005/004310 (4 pages).

PCT Written Opinion of the International Searching Authority issued Mar. 23, 2006 in corresponding PCT App. No. PCT/KR2005/004310 (3 pages).

Eckert M P et al., "Perceptual quality metrics applied to still image compression—A technique for visual optimization of DCT quantization matrices for individual images", Signal Processing, Elsevier Science Publishers B.V., Amsterdam, NL, vol. 70, No. 3, Nov. 30, 1998, pp. 177-200.

Athanassios Skodras et al., "The JPEG 2000 Still Image Compression Standard", IEEE Signal Processing Magazine, IEEE Service Center, Piscataway, NJ, US, vol. 18, No. 5, Sep. 1, 2001, pp. 36-58.

Zhou Wang et al., "A Universal Image Quality Index", IEEE Signal Processing Letters, IEEE Service Center, Piscataway, NJ, US, vol. 9, No. 3, Mar. 1, 2002.

European Search Report dated Feb. 15, 2011 in corresponding European Patent Application 05822193.8.

Japanese Office Action mailed Sep. 20, 2011 issued in corresponding Japanese Patent Application No. 2007-545388.

European Office Action dated Oct. 28, 2011 issued in corresponding European Patent Application No. 05882193.8.

Tremeau, A. et al., "Color Quantization Error in Terms of Perceived Image Quality", Proceedings of the International Conference on Acoustics, Speech, and Signal Processing, Apr. 19-22, 1994, pp. V93-V96.

Ingo Höntsch et al., Locally Adaptive Perceptual Image Coding, IEEE Transactions on Image Processing, vol. 9, No. 9, Sep. 9, 2000.

A. Mazzarri et al., "Perceptual embedded image coding using wavelet tranforms", IEEE 1995.

Wen-Hsiao Peng et al., "Context-Based Binary Arithmetic Coding for Fine Granuality Scalabitliy", Dept. of Engineering, National Chiao-Tung University, Date:2003.

Ingo Höntsch et al, "Apic: Adaptive Preceptual Image Coding Based on Subband Decomposition with Locally Adaptive Perceptual Weighting", IEEE 1997.

Takahiko Masuzaki et al., "JPEG2000 Adaptive Rate Control for Embedded Systems", Department of Communications and Computer Engineering, IEEE 2002.

Jinho Choi et al., "A Stable Feedback Control of the Buffer State Using the Controlled Lagrange Multiplier Method", IEEE Transactions on Image Processing, vol. 3, No. 5, Sep. 5, 1994.

Zhong Guangjun et al., "A Simple 9/7-Tap Wavelet Filter Based on Lifting Scheme", School of Computer, National University of Defence Technology, IEEE 2001.

Chun-Hsien Chou et al., "A Perceptually Tuned Subband Image Coder Based on the Measure of Just-Noticeable-Distortion Profile", IEEE Transactions on Circuits and Systems for Video Technology, vol. 5, No. 6, Dec. 6, 1995.

Amir Said et al, "A New Fast and Efficient Codec Based on Set Partitioning in Hierarchical Trees", IEEE Transactions on Circuits and Systems for Video Technology, vol. 6, Jun. 1996.

Shih-Ta Hsiang et al., "Embedded Image Coding Using Zeroblocks on Subband/Wavelet Coefficients and Context Modeling", Center for Image Processing Research and Electrical, Computer, and Systems Engineering Department, Rensselaer Polytechnic Institute, Date:2000.

Ying Zhang et al., "Improved Lifting Scheme for Block Subband Coding", Department of Electrical and Computer Engineering, The University of Western Ontario and Department of Electrical and Computer Engineering, Ryerson Polytechnic University, IEEE 1999.

H.R. Wu et al., "Adaption of Vision Model Based Distortion Metrics to Perceptual Image Coding", Computer Science and Software Engineering, Monash University and Visual Information Processing Lab, Motorola Australia Research Centre, Date:2002.

Hyun Duk Cho et al., "A Region-Based Adaptive Perceptual Quantization Technique for MPEG Coder", IEICE Trans. Information and Systems, vol. ED012, No. 1, Jan. 1995.

(56) References Cited

OTHER PUBLICATIONS

"Coding of moving pictures and associated audio for digital storage media at up to about 1,5 Mbit/s" International Standard ISO/IEC 11172-2:1993, Published Dec. 1, 1999.
Jerome M. Shapiro, "Embedded Image Coding Using Zerotrees of Wavelet Coefficients" IEEE Transactions on Signal Processing vol. 41, No. 12, Dec. 1993.
S. Lawson et al., "Image Compression using wavelets and JPEG2000: a tutorial", Electronics and Communication Engineering Journal, Jun. 2002.
Maria Grazia Albanesi, "Wavelets and Human Perception in Image Compression", University of Pavia, IEEE 1995.
Peter Noll, "MPEG Digital Audio Coding", Setting the Standard for High-Quality Audio Compression, IEEE Signal Processing Magazine, Sep. 1997.

* cited by examiner (a)

(b)

(c)

(d)

(a)

(b)

(c)

(d)

(a)

(b)

(c)

(d)

(a)

(b)

(c)

(d)

(a)

(b)

(c)

(d)

APPARATUS FOR ENCODING AND DECODING IMAGE AND METHOD THEREOF

CROSS-REFERENCE TO RELATED PATENT APPLICATION

This application is a 371 of PCT/KR2005/004310 Dec. 14, 2005 and claims the benefit of Korean Patent Application No. 10-2004-0105383, filed on Dec. 14, 2004, in the Korean Intellectual Property Office, the disclosure of which is incorporated herein in its entirety by reference.

BACKGROUND OF THE INVENTION

1. Field of the Invention

The present invention relates to image encoding and decoding, and more particularly, to an image encoding and/or decoding apparatus for encoding an image with a quantization parameter determined by using an allowable noise having no subjective loss, and decoding the encoded bitstream, and a method thereof.

2. Description of the Related Art

Until now, many trials to apply a human visual system to image encoding have been made. These efforts are based on that human visual ability evaluating the picture quality of a restored image does not match a simple perspective of signal processing. However, in the image encoding field, many approaches are beginning their research still with an assumption that noise which a human being feels is the same as a signal noise. In particular, a mean square error (MSE) can be said to be a signal noise that is most widely used, and the degree of picture quality of an image restored according to the MSE is numerically evaluated by a peak signal to noise ratio (PSNR).

As a visual characteristic index generally widely used, there is a just noticeable distortion (JND) value. The JND value is calculated by considering a relative change degree of neighboring pixel values for one pixel value, and models a characteristic that a human being cannot recognize a big noise in a complicated background. In encoding of an image, a JND value obtained in each pixel is used to additionally adjust a quantization parameter in a quantization process. Through this process, a region to which the human visual characteristic is sensitive is made to generate less noise, and a region to which the human visual characteristic is insensitive is made to generate more noise so that the compression ratio can be increased.

Meanwhile, in addition to the JND value, the human visual characteristic in frequency domain can be considered. For this, a modulation transfer function of the human visual characteristic is empirically obtained from a variety of test images, and by using this, a quantization weight value of each frequency band for a discrete cosine transform (DCT) coefficient is extracted.

These methods applying the human visual characteristic to image encoding by using the JND value or the quantization weight have many limitations. When the quantization weight is used, a problem that the weight value in relation to only the frequency component is uniformly applied arises. Also, the applying of the JND value has a problem because the human visual characteristic does not rely only on the relative value to the neighboring pixel values. Furthermore, since the JND value should be calculated for each pixel value, a quantization parameter that is basically provided to control the quantity of bits should be modified in units of pixels. Accordingly, separate information before modification should be transferred to a decoder, or a JND value in the decoder should be calculated as the same value as the JND value in the encoder. At this time, the basic problem is that the decoder has only a reproduced value, and therefore the encoder should calculate the JND value with a reproduced value as in the decoder.

Documents related to image encoding applying the human visual characteristic include Bowonkoon Chitprasrt and K. R. Rao's article, "Human Visual Weighted Progressive Image Transmission" (IEEE Trans. Communications, vol. 38, pp. 1040-1044, July, 1990), ISO/IEC 11172-2, Information Technology-Coding of Moving Pictures and Associated Audio for Digital Storage Media at Up to About 1.5 Mbits/s Part 2: Video, 1993, and King N. Ngan, Kin S. Leong, and H. Singh's article, "Adaptive Cosine Transform Coding of Image in Perceptual Domain" (IEEE Trans. Acoustics, Speech and Signal Processing, vol. 37, pp. 1743-1750, November 1989).

SUMMARY OF THE INVENTION

The present invention provides an image encoding and decoding method to encode an image with a quantization parameter determined by using an allowable noise without any subjective loss, and an image decoding apparatus and method thereof.

The present invention also provides an image encoding and decoding method by which an image is quantized with a quantization parameter determined by using an allowable noise without any subjective loss, each coding block is divided into quality layers, and the quantized image is encoded in a scanning order of each quality layer, and an image decoding apparatus and method thereof.

According to an aspect of the present invention, there is provided an image encoding apparatus including: a transform unit removing spatial redundancy by transforming an original image being input; an allowable noise obtaining unit obtaining an allowable noise from the original image; a quantization parameter determination unit determining a quantization parameter by using the allowable noise; a quantization unit generating a quantized coefficient, by quantizing a transform coefficient provided from the transform unit by using the quantization parameter; and an entropy encoding unit entropy encoding the quantized coefficient to remove statistical redundancy.

According to another aspect of the present invention, there is provided an image encoding apparatus including: a transform unit removing spatial redundancy by transforming an original image being input; an allowable noise obtaining unit obtaining an allowable noise from the original image; a quantization parameter determination unit determining a quantization parameter by using the allowable noise; a quantization unit generating a quantized coefficient, by quantizing a transform coefficient provided from the transform unit by using the quantization parameter; a quality layer determination unit determining a quality layer by using the allowable noise; and an entropy encoding unit entropy encoding the quantized coefficient in the scanning order with respect to the quality layers to remove statistical redundancy.

According to another aspect of the present invention, there is provided an image encoding method including: removing spatial redundancy by transforming an original image being input; obtaining an allowable noise from the original image; determining a quantization parameter by using the allowable noise; generating a quantized coefficient, by quantizing a transform coefficient provided from the transform unit by using the quantization parameter; and entropy encoding the quantized coefficient to remove statistical redundancy.

According to another aspect of the present invention, there is provided an image encoding method including: removing spatial redundancy by transforming an original image being input; obtaining an allowable noise from the original image; determining a quantization parameter by using the allowable noise; generating a quantized coefficient, by quantizing a transform coefficient provided from the transform unit by using the quantization parameter; determining a scanning order with respect to the quality layers determined using the allowable noise; and entropy encoding the quantized coefficient in the scanning order with respect to the quality layers to remove statistical redundancy.

According to another aspect of the present invention, there is provided an image decoding apparatus including: an entropy decoding unit generating a quantized coefficient, by entropy decoding an input bitstream; an inverse quantization unit generating a transform coefficient, by inverse quantizing the quantized coefficient; and an inverse transform unit generating a restored image, by inverse transforming the transform coefficient.

According to another aspect of the present invention, there is provided an image decoding method including: generating a quantized coefficient, by entropy decoding an input bitstream; generating a transform coefficient, by inverse quantizing the quantized coefficient; and generating a restored image, by inverse transforming the transform coefficient.

According to another aspect of the present invention, there is provided a computer readable recording medium having embodied thereon a computer program for executing the methods.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
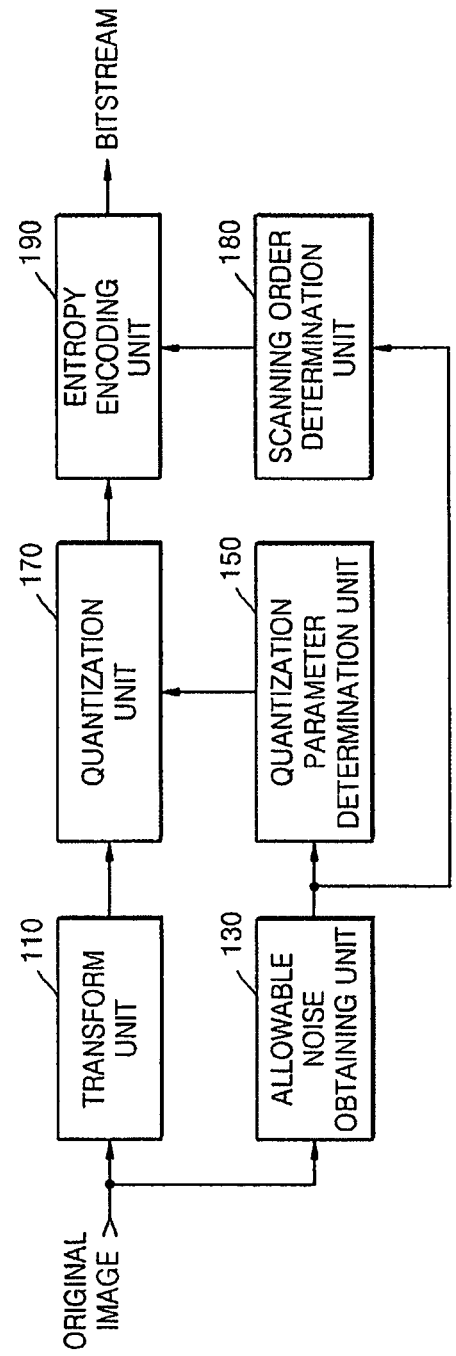
FIG. 1 is a block diagram showing a structure of an image encoding apparatus according to an embodiment of the present invention.

FIG. 1 is a block diagram showing a structure of an image encoding apparatus according to an embodiment of the present invention. The image encoding apparatus includes a transform unit 110, an allowable noise obtaining unit 130, a quantization parameter determination unit 150, a quantization unit 170, and an entropy encoding unit 190. Also, a scanning order determination unit 180 may be included optionally.

Referring to FIG. 1, the transform unit 110 is arranged to remove spatiotemporal redundancy in a frame image being input, and can use DCT, wavelet transform, prediction, or integer transform that is used in an image or video compression standard commercialized or set up. However, the transform method is not limited to these. The wavelet transform may be employed preferably.

The allowable noise obtaining unit 130 is arranged to obtain an allowable noise from the input original image, and provides the obtained allowable noise to the quantization parameter determination unit 150. Here, the allowable noise plays a role similar to that of a masking threshold value that is used in perception-based audio encoding. By using a color quantization algorithm as an embodiment, the allowable noise is obtained.

The quantization parameter determination unit 150 is arranged to determine one quantization parameter for each coding block unit, by using the allowable noise obtained in the allowable noise obtaining unit 130, and provides the quantization parameter to the quantization unit 170. That is, the quantization parameter determination unit 150 determines the quantization parameter of each coding block so that the quantization noise generated as a result of quantization of the coding block can be equal to or less than the allowable noise.

With respect to the transform coefficient of each coding block provided the transform unit 110, the quantization unit 170 is arranged to quantize the coding block by using the quantization parameter of the coding block determined in the quantization parameter determination unit 150, and provides the quantized transform coefficient of the coding block to the entropy encoding unit 190.

The scanning order determination unit 180 is arranged to determine a scanning order by using an arbitrary number of quality layers, each composed of bit planes determined by using an allowable noise in relation to the layer. Here, the quality layer indicates a boundary that can influence the picture quality of a restored image, that is, the quality of the image, when a loss occurs in transmission of a generated by an embedded coding. First, in case of a top bitrate, a first allowable noise ($\tau_k$) is determined by the color number (k) that can satisfy a first cost function guaranteeing a first quality. The first quality layer is determined, by using a second allowable noise ($\tau_m$) obtained by the color number (m) that is less than the color number (k) that determines the first allowable noise ($\tau_k$), so that a second cost function guaranteeing a second quality that is lower than the first quality can be satisfied. Likewise, the second quality layer is determined, by using a third allowable noise ($\tau_n$) obtained by the color number (n) that is less than the color number (m) that determines the second allowable noise ($\tau_m$), so that a third cost function guaranteeing a third quality that is lower than the second quality can be satisfied. At this time, the number of quality layers and the cost function corresponding to each quality layer can be input in the scanning order determination unit 180 in advance in the initial stage of encoding. That is, the scanning order is from an upper quality layer towards a lower quality layer.

The entropy encoding unit 190 generates a bitstream, by removing statistical redundancy in the quantized transform coefficient of each coding block provided by the quantization unit 170. At this time, at the top bitrate, with scanning data in units of coding block, entropy encoding is performed. Meanwhile, at a sub bitrate, entropy encoding is performed by scanning data in units of quality layers according to the scanning order determined in the scanning order determination unit 180. The entropy encoding unit 190 may perform embedded coding in order to provide a scalable function. At this time, a bit sliced arithmetic coding (BSAC) algorithm used in an MPEG-4 audio codec providing a fine granular scalability (FGS) function is applied. Also, an adaptive arithmetic coding by which a basic context is adaptively updated in order to enhance the compression efficiency of the BSAC algorithm can be applied. The entropy encoding algorithm thus applied to the present invention will be referred to as a context-based adaptive arithmetic encoding algorithm.

Figure 2:
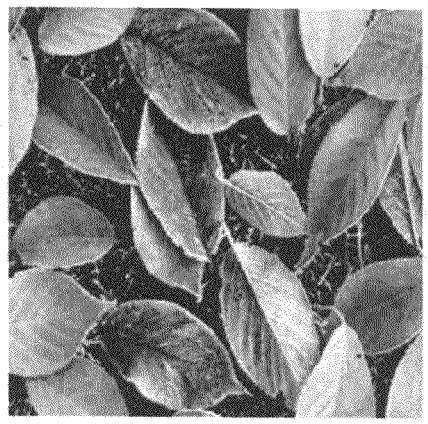
FIG. 2 illustrates a result of color quantization of leaves according to an embodiment of the present invention.
Figure 2:
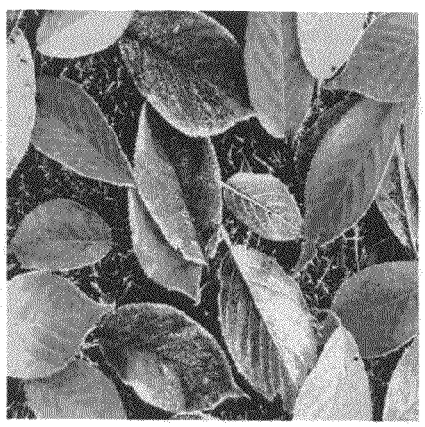
Figure 2:
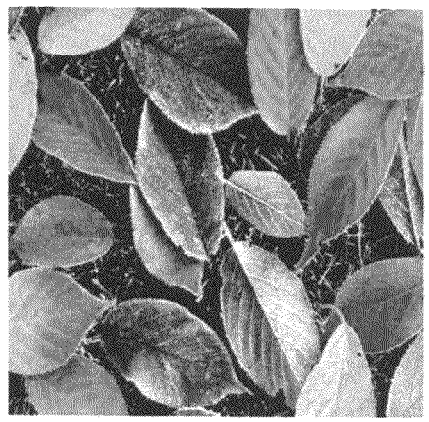
Figure 2:
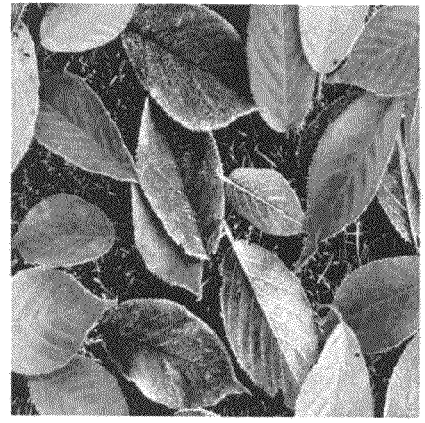
Figure 3:
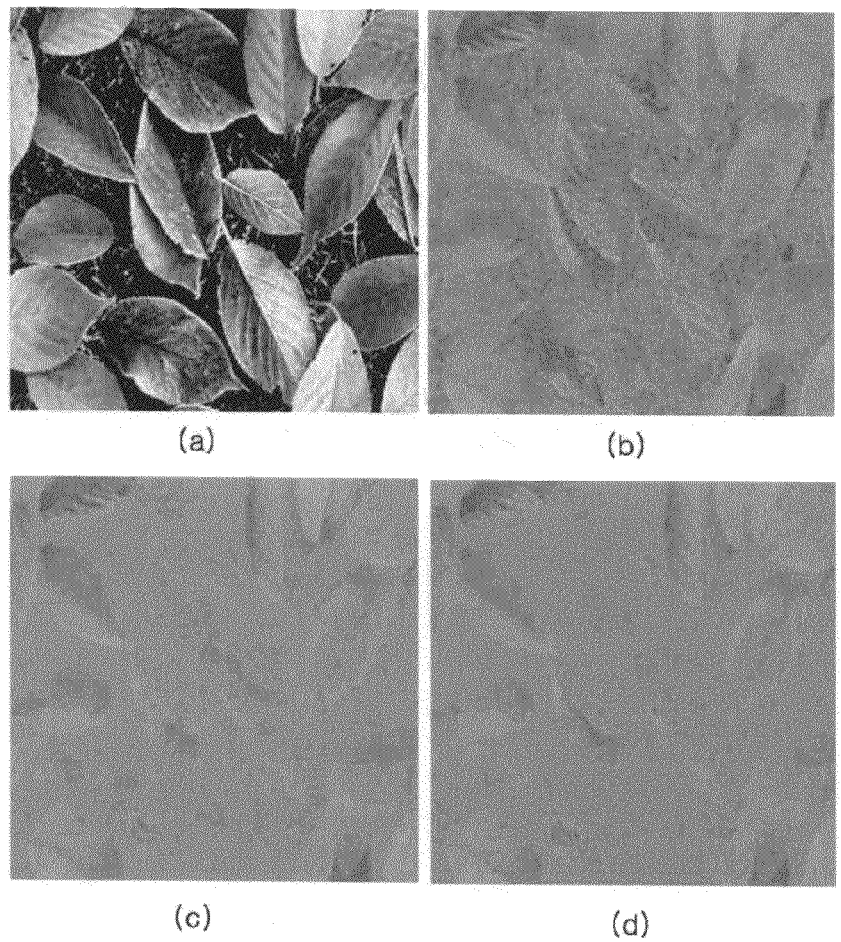
FIG. 3 illustrates error images between the original image and the color quantization results shown in FIG. 2 according to an embodiment of the present invention.

FIG. 2 illustrates a result of color quantization of leaves according to an embodiment of the present invention. FIG. 2 (*a*) shows an original image, FIG. 2 (*b*) shows the result of color quantization with color number 10, FIG. 2 (*c*) shows the result of color quantization with color number 30, and FIG. 2 (*d*) shows the result of color quantization with color number 40. FIG. 3 illustrates error images between the original image and the color quantization results shown in FIG. 2 according to an embodiment of the present invention. FIG. 3 (*a*) shows the original image, FIG. 3 (*b*) shows an error image between the original image and the image color quantized with color number 10, FIG. 3 (*c*) shows an error image between the original image and the image color quantized with color number 30, and FIG. 3 (*d*) shows an error image between the original image and the image color quantized with color number 40. Here, each error image is obtained by adding an offset of 128 to each of R, G, and B colors.

Before explaining detailed operations of the allowable noise obtaining unit 130, a color quantization algorithm will now be briefly explained.

In an image that is generally widely used, a pixel is composed of three components, R, G, and B, each expressed by 8 bits. In this case, the total number of colors expressing an image is $2^{24}$, which means the number of colors that can be expressed is very large. However, human perception cannot distinguish each of this number of colors, and this perception changes in a variety of ways according to the color distribution of neighboring pixels as well as the color value itself. As an example of the color quantization algorithm, there is one using Fibonacci Lattice and the characteristic that a human visual distance in relation to color relatively matches a numerical distance in a Lab space (Aleksandra Mojsilovic and Emina Soljanin, "Color Quantization and Processing by Fibonacci Lattices", IEEE Trans. Image Processing, vol. 10, pp. 1712-1725, November 2001). According to the algorithm, with a small number of colors, 512 or 1024, a restored image that a viewer cannot easily distinguish from the original image can be generated. In another example of the color quantization algorithm, a new image noise is defined by using correlation of pixels, noise in luminance, and noise in brightness contrast (Zhou Wang and Alan C. Bovik, "Universal Image Quality Index", IEEE Signal Processing Letters, vol. 9, pp. 81-84, March 2002). In still another example of the color quantization algorithm, human perception is modeled with homogeneity and distinctiveness, and the sensitivity with respect to perception in each image is expressed as a weight value. By using this weight value, an image is expressed with a small number of colors (Kuk-Jin Yoon and In-So Kweon, "Human Perception Based Color Image Quantization", 17th International Conference on Pattern Recognition, August, 2004). The characteristic of this algorithm is that in the color quantization using an image weight value extracted by using visual characteristic, an optimum color number (n) is determined according to progressive color quantization and a defined cost function. Accordingly, through this process, it is possible to obtain from a quantization image unit composed of 2 colors up to a quantized image composed of n colors. Meanwhile, the color quantization algorithm in image encoding is used in relation with a concept of color vector quantization. That is, after performing color quantization, a mapping table for mapping quantized values to actual pixel values, and an index image composed of quantized pixels are compressed through entropy coding (Zhu Li and Aggelos K. Katsaggelos, "Color Vector Quantization based Video Coder", IEEE International Conference on Image Processing, vol. 3, pp. 673-676, October 2002).

The allowable noise obtaining unit 130 obtains an allowable noise, by using the result of color quantization of the original image in units of frames or in units of predetermined blocks. This will now be explained in more detail. It is assumed that the original image is $\alpha(x, y)$ (hereinafter referred to as $\alpha$), and an image which is color quantized with color number k is $\beta_k(x, y)$ (hereinafter referred to as $\beta_k$), wherein it is assumed that $\alpha$ and $\beta_k$ are visually identical. Here, $\alpha$ and $\beta_k$ in relation to an arbitrary integer k can be expressed as the following equation 1:

$$\alpha = \beta_k + \tau_k \quad (1)$$

Here, $\tau_k$ is an error image of the original image ($\alpha$) and the image ($\beta_k$) color quantized with color number k.

At this time, integer h satisfying the following equation can be obtained:

$$h = \min_k [k; \alpha \approx \beta_k] \quad (2)$$

In equation 2, there may be a variety of ways to find integer h. For example, an appropriate cost function that can satisfy equation 2 is defined and by gradually increasing the color number from 2 to n, a minimum color number that the error image of the original image and a color quantized image can satisfy the cost function is determined.

Meanwhile, in relation to arbitrary integer k(≥h), even though an image (r) is generated by replacing the error image ($\tau_k$) with an arbitrary noise (e) satisfying the following equation 3, there is still a relation $\alpha \approx \beta_k \approx \gamma$.

$$e \leq \tau_k \quad (3)$$

Here, the error image ($\tau_h$) is defined as an allowable noise, and when a noise equal to or less than the allowable noise is included, the original image and the quantized image are identical. That is, there is no subjective loss between the two images. The allowable noise is obtained by dividing respective pixel values or their absolute values, existing in a determined error image ($\tau_h$), into predetermined blocks, for example, in units of coding blocks.

Figure 4:
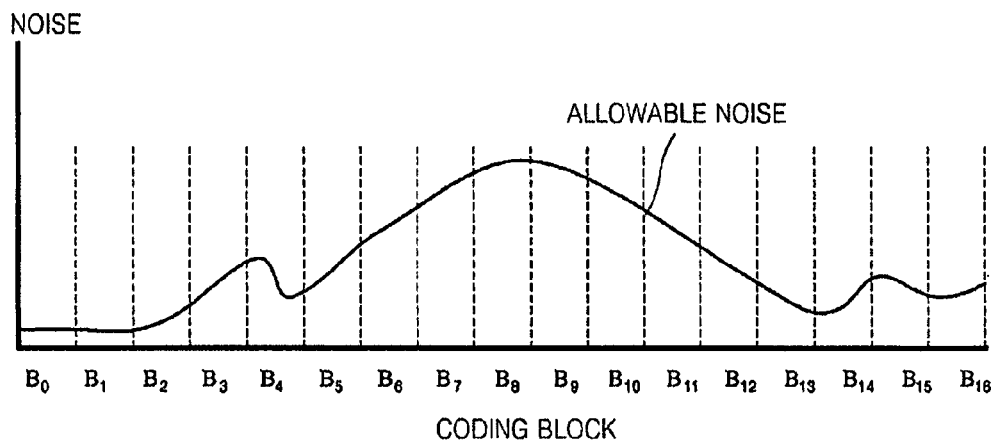
FIG. 4 illustrates allowable noises obtained in coding block units with respect to the original image in an allowable noise obtaining unit of FIG. 1 according to an embodiment of the present invention.

FIG. 4 illustrates allowable noises obtained in units of pixels in relation to an original image in the allowable noise obtaining unit 130 of FIG. 1. Here, the absolute values of pixel values in the error image ($\tau_k$) are taken and expressed in units of coding blocks in a graph.

Figure 5:
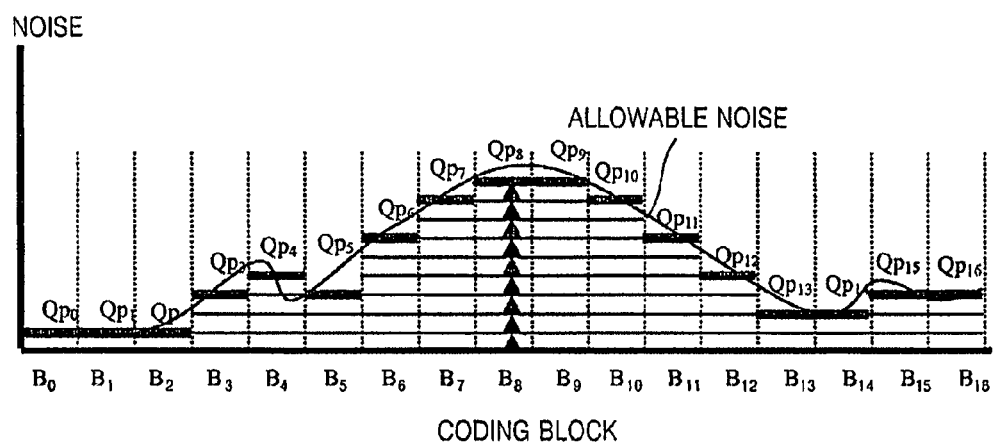
FIG. 5 illustrates an operation of a quantization parameter determination unit of FIG. 1 according to an embodiment of the present invention.

FIG. 5 illustrates an operation of the quantization parameter determination unit 150 of FIG. 1 according to an embodiment of the present invention. One quantization parameter is determined for each coding block. For example, a coding block $B_0$ has a quantization parameter $Qp_0$, a coding block $B_8$ has a quantization parameter $Qp_8$, and a coding block $B_{16}$ has a quantization parameter $Qp_{16}$. Referring to FIG. 5, a method of determining a maximum quantization parameter (810 in FIG. 8) by using an allowable noise in order to generate a quantization noise, that is, an encoding error, equal to or less than the allowable noise will now be explained.

After an original image ($\alpha$) is quantized by using a quantization parameter (Qp), an image ($\alpha'$) is restored through inverse quantization by using the identical quantization parameter (Qp). The restored image ($\alpha'$) can be expressed as the following equation 4:

$$\alpha' = \Psi(\alpha, Qp) \quad (4)$$

Here, ψ is a function indicating a process in which the original image (a) is quantized by using the quantization parameter (Qp), and then is inverse quantized by using the identical quantization parameter (Qp). Here, the quantization and the inverse quantization can be performed by applying a variety of algorithms. For example, a uniform quantization algorithm having a dead zone can be applied. At this time, quantization and inverse quantization can be expressed as the following equations 5 and 6. Equations 5 and 6 are designed to perform quantization by dividing a value that is obtained by doubling a quantization parameter, into six equal parts:

$$X' = \text{sign}(X) * |X| * 2^{Qp*(-1/6)} + 0.5 \quad (5)$$

$$X = \text{sign}(X') * |X'| * 2^{Qp*(1/6)} \quad (6)$$

Meanwhile, a quantization noise can be expressed as the following equation 7:

$$\Delta = \alpha' - \alpha \quad (7)$$

Since the quantization parameter (Qp) is information to be encoded, encoding of the quantization parameters (Qp) for all pixels respectively is very inefficient. Accordingly, the original image ($\alpha$) is divided into block units of a predetermined size, for example, coding block units, and a quantization parameter is determined for each coding block unit. Assuming that an arbitrary coding block is $\alpha_b$, and the quantization parameter of the coding block $\alpha_b$ is $Qp_b$, equations 4 and 5 can be expressed as the following equations 8 and 9:

$$\alpha'_b = \Psi(\alpha_b, Qp_b) \quad (8)$$

$$\Delta_b = \alpha'_b - \alpha_b \quad (9)$$
$$= \Psi(\alpha_b, Qp_b) - \alpha_b$$

If equation 9 is associated with an allowable noise, the quantization parameter of a coding block can be expressed as the following equation 10:

$$Qp_b = \min_{Qp_b}(\tau_b - \Delta_b) \quad (10)$$
$$= \min_{Qp_b}(\tau_b - (\alpha'_b - \alpha_b))$$
$$= \min_{Qp_b}(\tau_b - (\Psi(\alpha_b, Qp_b) - \Delta_b))$$
$$= \min_{Qp_b}(\tau_b - \Delta_b - \Psi(\alpha_b, Qp_b))$$
$$= \min_{Qp_b}(\eta_b - \Psi(\alpha_b, Qp_b))$$

Here, $\tau_b$ and $\Delta_b$ are the allowable noise of a coding block existing in an entire error image, and the quantization noise of coding block ($\tau_b$). Since these values can be known after the allowable noise is obtained, these are set as constant $\eta_b$.

In order to determine the quantization parameter ($Qp_b$) of each coding block, a method of gradually increasing from a smaller value to a bigger value with a predetermined variation step is employed, but the present invention is not necessarily limited to this. The initial value of the quantization parameter ($Qp_b$) of a coding block and the variation steps have a trade-off relation of the amount of calculation and accuracy. In the allowable noise graph shown in FIG. 5, the thick line marked for each codling block ($B_0$~$B_{17}$) indicates a limit value of an allowable noise set for the coding block. That is, the quantization parameter of each coding block is determined so that a quantization noise equal to or less than the allowable noise limit value set to each coding block can be generated.

Meanwhile, the image encoding using an allowable noise can be applied to a variety of types of encoders. For example, it is assumed that a transform process and an inverse transform process used in the encoding are defined as the following equations 11 and 12, respectively:

$$y = \Phi(x) \quad (11)$$

$$x = \Phi^{-1}(y) \quad (12)$$

At this time, by using a concept of transform, equation 1 can be expressed as the following equation 13:

$$\Phi(\alpha) = (\beta_k + \tau_k) \quad (13)$$

If the linearity of the transform concept is used, equation 13 can be expressed as the following equation 14:

$$\Phi(\alpha) = \Phi(\beta_k) + \Phi(\tau_k) \quad (14)$$

If a block concept is introduced, equation 14 can be expressed as the following equation 15:

$$\Phi_b(\alpha) = \Phi_b(\beta_k) + \Phi_b(\tau_k) \quad (15)$$

It can be known that from equations 14 and 15, the concept of the allowable noise can be used both in the transform in units of the entire image and in the transform in units of blocks.

Referring again to FIG. 1, considering the compression efficiency, scalable function and complexity, the entropy encoding unit 190 performs entropy encoding through embedded coding using context-based adaptive arithmetic encoding. At this time, for the context-based adaptive arithmetic encoding, a context is set. The probability value of a current symbol is predicted from the processed context of data, and is applied to the arithmetic encoding. Accordingly, it is needed to explain the context so that the probability value can be predicted appropriately. In selection of a context, a context having a high correlation with the current symbol is selected.

Meanwhile, in order to form a structure of a plurality of layers for an original image for embedded coding, the transform unit 110 may perform multiple layer wavelet filtering. Since each layer provides information on different resolution together with information on the upper layer, the multiple layer wavelet filtering can provide spatial scalability. The top layer is composed of only a low-low (LL) band, and the remaining lower layers are composed of low-high (LH), high-low (HL), and high-high (HH) bands, respectively. In order to reproduce each layer, information on the upper layer is all provided. Accordingly, the order of layers for entropy encoding begins from the top layer to a lower layer.

Meanwhile, in order to perform entropy encoding of bands forming each layer, a coding block is defined. The size of the coding block may vary with respect to the layer, and when encoding is performed, the coding block can be defined with an encoding parameter. The coding block can be used as a unit for determining a quantization parameter, a unit for providing information on a most significant bit (MSB) in relation to a quantized coefficient value, a unit for providing information on a lazy bit, and a unit for scanning a block. The entropy encoding unit 190 performs bit plane encoding in the block scanning unit, that is, in units of coding blocks. That is, by scanning bits of pixels from the MSB to a least significant bit (LSB) in a scanning line order, the encoding is performed.

The context-based adaptive arithmetic encoding applied to the entropy encoding unit 190 will now be explained in more detail.

When a smallest input unit for entropy encoding in relation to a quantized coefficient is referred to as a symbol, the symbol has any one value of 0 and 1, because the BSAC algorithm is for bit plane coding for quantized coefficients. Accordingly, the BSAC algorithm applied to the present invention is basically binary arithmetic encoding. As an element that should be considered in order to select a context for each symbol, there is the correlation of each context with each symbol. That is, if the correlation of a context with each symbol is high, the probability value of the symbol can be predicted more accurately, and according to the accurate probability value, the compression efficiency can be increased when arithmetic encoding is performed. As an element that should be considered together with the correlation in order to select a context, there is the causability of a context. That is, since a context that is used in an encoder should be composed of values identical to those of a context to be used in a decoder, the context is composed of symbols, or additional information items already processed and encoded. Meanwhile, as another element that should be considered with the correlation in order to select a context, there is complexity. Since the BSAC algorithm regards all bits from the MSB to the LSB of the all quantized coefficients, as symbols, the number of symbols to be processed is very large. If the types of contexts for each symbol are too many, the compression efficiency can be increased, but it can impose a heavy burden in the aspects of memory capacity and processing speed in the encoder and decoder. In particular, in case of the adaptive arithmetic encoding, excessively various contexts can decrease the adaptive speed in relation to a new bit pattern such that the compression efficiency can be lowered.

Figure 6:
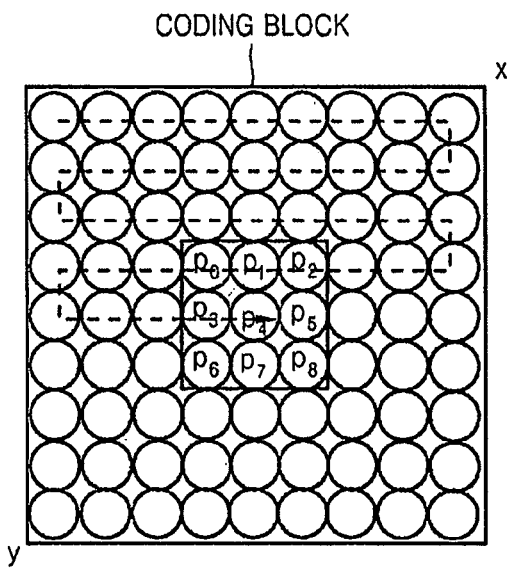
FIG. 6 illustrates a 3×3 window used in an entropy encoding unit of FIG. 1 in order to set a context according to an embodiment of the present invention.

In order to set a context for each symbol, by considering complexity and the characteristic of an image that a correlation between neighboring pixels is higher, the entropy encoding unit 190 sets, for example, a 3×3 window centered at the pixel of each symbol in one coding block. According to this, a context in relation to pixels included in one window can be built. FIG. 6 illustrates a 3×3 window applied to an arbitrary coding block in order to set a context in the entropy encoding unit 190 of FIG. 1.

Next, in order to perform bit plane encoding, the binary arithmetic encoding is performed, by predicting the probability value of an arbitrary bit plane (j) as the following equation 16:

$$P(j) = f(l, b, j-L, v_j, w_j), \; j \geq L \quad (16)$$
$$= 1/2, \; j < L$$

Here, j is the bit plane number of a symbol, l is a layer number, and b is a band number. L is a lazy bit, $v_j$ is the number of 1's occurring in a (j+1)-th bit plane, and $w_j$ is a bit pattern already processed in a j-th bit plane.

Meanwhile, the lazy bit (L) is determined according to the following equation 17:

$$L = \mathrm{MSB}(m) \quad (17)$$

Here, m is the mean of pixels included in a coding block, and MSB(x) is a top bit position having value 1 in a bit plane expressing x.

Figure 7:
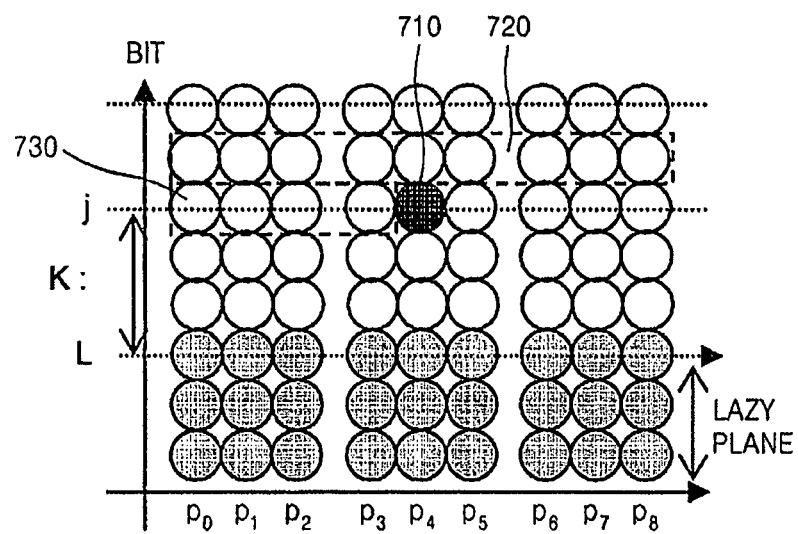
FIG. 7 illustrates a lazy bit used in encoding of a bit plane in the entropy encoding unit of FIG. 1 according to an embodiment of the present invention.

FIG. 7 illustrates a context used in encoding of a bit plane in the entropy encoding unit 190 of FIG. 1 according to an embodiment of the present invention.

Referring to FIG. 7, for example, calculation of the context of a symbol 710 included in the j-th bit plane is determined by using bits 720 of the (j+1)-th bit plane immediately above, and 4 bit patterns 730 already processed in the j-th bit plane. Meanwhile, in a bit plane lower than the lazy bit (L), that is, in a lazy plane, the probability value is set to a fixed value, ½. Since a separate context calculation for symbols in a bit plane lower than the lazy bit (L) is not performed, the amount of calculation can be reduced as much. If there are a variety of coefficients quantized with different quantization parameter values, the using of the lazy bit provides a relative bit plane value (j-L) such that the encoding efficiency can be greatly improved.

Figure 8:
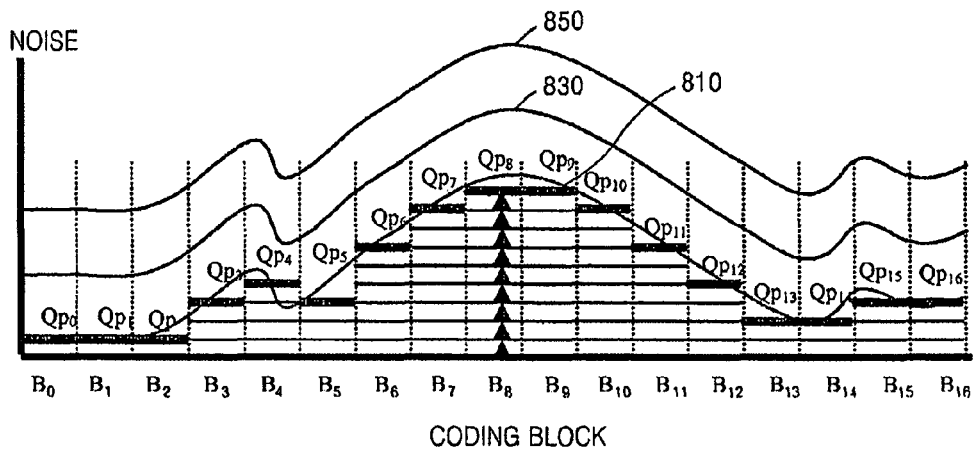
FIG. 8 illustrates an operation of a scanning order determination unit of FIG. 1 according to an embodiment of the present invention.

FIG. 8 illustrates an operation of the scanning order determination unit 180 of FIG. 1 according to an embodiment of the present invention.

In the entropy encoding unit 190, a restored image in which noise is subjectively minimized can be obtained in the top bitrate. Also, since spatial and SNR scalability is provided through the context-based adaptive arithmetic encoding, a bitstream, once generated, can be truncated as required with respect to a purpose, and can be used for reproduction. A problem of optimization of picture quality occurring when part of a bitstream is thus used will now be explained.

For optimization of the picture quality of an image reproduced from part of a bitstream, positioning important information in the front part in the building of a bitstream, and optimizing a bitstream with an arbitrary size in the aspect of a subjective picture quality can be considered. That is, when part of a bitstream is truncated, the truncation is performed from the end side of the entire bitstream. Accordingly, important information having a greater influence on the picture quality is made to be disposed in the front part. These are all closely related to the scanning order for entropy encoding.

Figure 9:
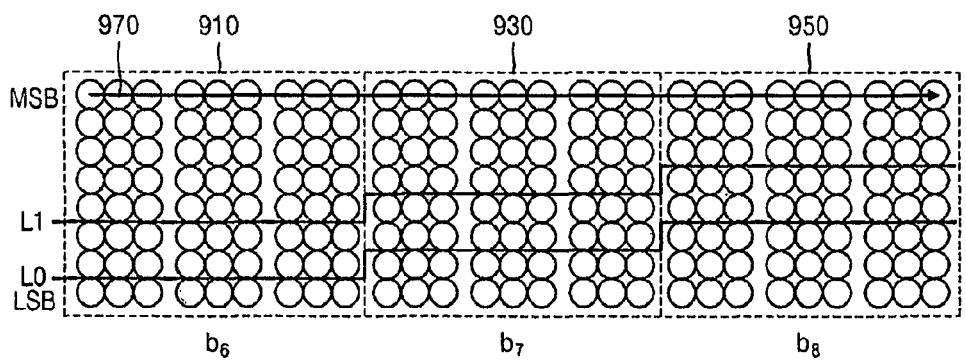
FIG. 9 illustrates a scanning order depending on quality layers determined in FIG. 8 according to an embodiment of the present invention.

In the entropy encoding unit 190, at the top bitrate, data is scanned in units of coding blocks (910, 930, 950 in FIG. 9) according to the context-based adaptive arithmetic encoding, and each coding block is scanned in the scan line direction (970 in FIG. 9) in relation to each bit plane. For optimization of a sub bitrate, the scanning order of a coding block, the scanning order of pixels in a coding block, and the scanning order in a bit plane can be considered. For the scanning order of the coding block and the scanning order of pixels in the coding block, the aspect of the amount of memory use or complexity should be considered together. Also, when necessary, a table setting a scanning order in order to scan an important coding block and important pixels with priority can be used or the scanning order can be changed adaptively.

In the context-based adaptive arithmetic encoding, all bit planes from the MSB to the LSB in one coding block are scanned and then, another coding block is scanned. This scan method relates to the concept of a mean square error (MSE), and is based on an assumption that the importance of each pixel in relation to a bit plane increases with the decreasing distance to the MSB. Accordingly, at the top bitrate, this assumption can be applied, but it can be limitedly applied to a sub bitrate.

To solve this problem, in the scanning order determination unit 180, a quality layer is determined in relation to the quantized coefficients. The quality layer is a method employed in an embedded block coding with optimized truncation algorithm (EBCOT) (David Taubman, "High Performance Scalable Image Compression with EBCOT", IEEE Trans. Image Processing, vol. 9, pp. 1158-1170, July 2000). In the scanning order determination unit 180, an arbitrary number of quality layers for bit plane encoding are disposed. One quality layer is composed of bit planes determined by using an allowable noise in relation to the layer. Among the constructed quality layers, scan is performed from the top quality layer.

How optimization in the visual noise aspect is achieved at a sub bitrate by using an allowable noise will now be explained.

Assuming that the number of quality layers is n, a bitstream (v) composed of n quality layers (L0, L1 etc. of FIG. 9) can be expressed as $v = v_0 v_1, \ldots, v_{n-1}$. Here, assuming that a processing of decoding the bitstream (v) is $\omega = \lceil (v) \rceil$, n reproduced images, that is, $\omega_0 = \lceil (v_0) \rceil$, $\omega_1 = \lceil (v_0 v_1) \rceil$, $\ldots$, $\omega_{n-1} = \lceil (v_0 v_1 \ldots v_{n-1}) \rceil = \lceil (v) \rceil$, can be obtained by a scalable function. At this time, the error image in relation to each reproduced images can be expressed as $\epsilon_0 = \omega_0 - \alpha$, $\epsilon_1 = \omega_1 - \alpha$, $\ldots$, $\epsilon_{n-1} = \omega_{n-1} - \alpha$. In order to obtain an allowable noise (830 and 850 of FIG. 8) to be used in each stage, images color quantized from the original image are obtained first. These color quantized images $\beta_0$, $\beta_1, \ldots, \beta_{n-1}$ have the characteristic as the following equation 18:

$$\alpha \approx \beta_{n-1}$$

$$\Psi(\beta_p) < \Psi(\beta_q), p < q \quad (18)$$

Here, $\Psi(\beta)$ is the number of colors in image $\beta$.

An allowable noise ($\tau_i$) in relation to each of the color quantized images is obtained according to the following equation 19:

$$\tau_i = \alpha - \beta_i, i = 0, \ldots, n-1 \quad (19)$$

Assuming that image $\beta_i$ color-quantized in each stage in equation 13 reproduces a visually optimum image with respect to a given color number (i), if equation 19 is satisfied, it can be said that optimization in relation to each quality layer is achieved at each sub bitrate on an R-D curve based on the human visual characteristic. That is, there is a relation as the following equation 20:

$$\epsilon_i = \tau_i, i = 0, \ldots, n-1 \quad (20)$$

Figure 10:
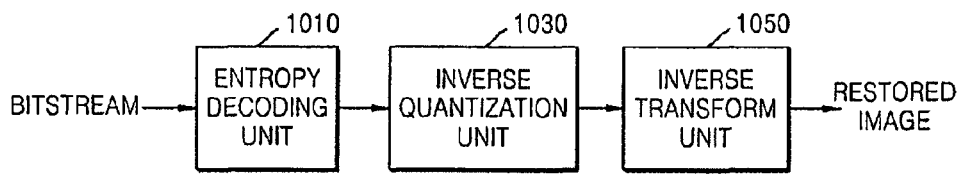
FIG. 10 is a block diagram of a structure of an image decoding apparatus according to an embodiment of the present invention.

FIG. 10 is a block diagram of a structure of an image decoding apparatus according to an embodiment of the present invention. The decoding apparatus includes an entropy decoding unit 1010, an inverse quantization unit 1030, and an inverse transform unit 1050.

Referring to FIG. 10, the entropy decoding unit generates a quantized coefficient, by entropy decoding an input bitstream. The entropy decoding process corresponds to an inverse process of the entropy encoding process of the image encoding apparatus shown in FIG. 1.

The inverse quantization unit 1030 generates a transform coefficient, by inverse quantizing the quantized coefficient provided by the entropy decoding unit 1010. The inverse quantization process corresponds to an inverse process of the quantization process of the image encoding apparatus shown in FIG. 1.

The inverse transform unit 1050 generates a restored image, by inverse transforming the transform coefficient provided by the inverse quantization unit 1030. The inverse transform process corresponds to an inverse process of the transform process of the image encoding apparatus shown in FIG. 1.

Next, comparison experiments performed in order to evaluate the performance of the image encoding and decoding algorithm according to an embodiment of the present invention will now be explained. The test image had a 512× 512 size, and YUV444 format for color was used. For wavelet decomposition and synthesis, a 9/7 filter was used for the Y component, 5/3 filters were used for U and V components. The coefficient values of the used filters were the same as those for JPEG2000. Meanwhile, all wavelet filters were implemented to have a lifting structure. The wavelet decomposition could be performed to the fifth steps and spatial scalable images of a total of 6 steps could be restored. At this time, coding blocks were set as the following table 1:

TABLE 1

| | Layers | | | | | |
| --- | --- | --- | --- | --- | --- | --- |
| | Layer 5 | Layer 4 | Layer 3 | Layer 2 | Layer 1 | Layer 0 |
| Coding block size | 4 × 4 | 4 × 4 | 8 × 8 | 8 × 8 | 16 × 16 | 16 × 16 |

JPEG2000 software used for the comparison experiment is reference software disclosed at the JPEG2000 website (http://www.jpeg.org/jpeg2000/index.html), and is Jasper version 1.701.0. At this time, the encoder option was set as a default and the experiments were performed.

Figure 11:
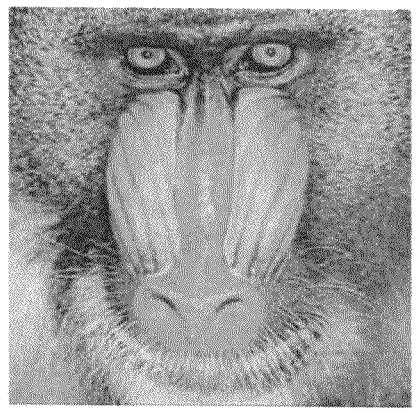
FIGS. 11 (*a*) through (*d*) illustrate test images used to evaluate the performance of an image encoding and decoding algorithm according to an embodiment of the present invention.
Figure 11:
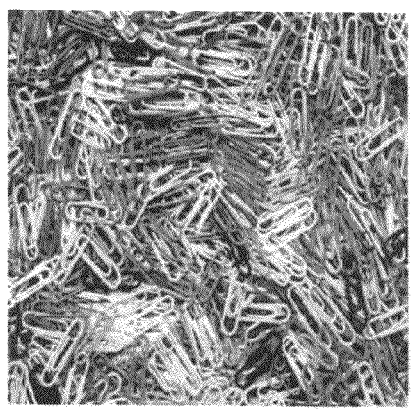
Figure 11:
Figure 11:
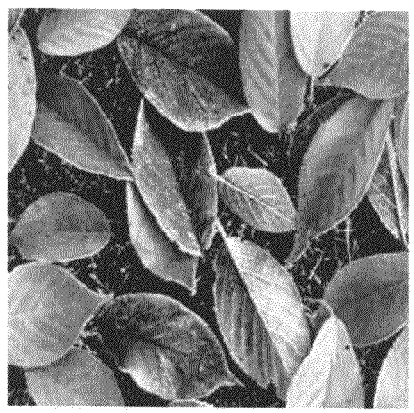

FIGS. 11 (*a*) through (*d*) illustrate examples of the test images, a baboon, clips, a parrot, and leaves, respectively. Each image has a 512×512 size and each of the R, G, and B components is 8 bits long.

While the R-D optimization process in the MSE concept was not performed when the encoding and decoding algorithm according to the present invention were performed, the R-D optimization process in the MSE was performed in the JPEG2000. In respect of the PSNRs measured under this environment, in case of the luminance component, the image decoded according to the JPEG2000 shows a value approximately 0.8 dB higher with respect to the types of the test image and the compression ratio.

The following table 2 shows comparison of PSNR values of the images decoded by the present invention and the JPEG2000, respectively, and shows that there was a PSNR difference in the data:

TABLE 2

| Test image | Compression ratio | Present invention (Y, U, V) | JPEG2000 (Y, U, V) |
|---|---|---|---|
| Baboon | 20:1 | 27.00, 30.63, 31.09 | 28.29, 30.34, 31.07 |
|  | 50:1 | 23.99, 28.99, 29.78 | 24.45, 29.02, 29.93 |
| Clips | 20:1 | 20.74, 25.32, 24.57 | 20.86, 25.16, 24.44 |
|  | 50:1 | 16.08, 21.97, 20.99 | 17.28, 22.34, 21.32 |
| Parrot | 100:1 | 28.12, 33.21, 32.81 | 30.87, 35.05, 33.98 |
|  | 200:1 | 24.79, 30.20, 29.28 | 28.23, 32.41, 31.00 |
| Leaves | 20:1 | 26.88, 32.92, 33.24 | 27.90, 34.64, 33.75 |
|  | 50:1 | 22.33, 32.10, 31.03 | 23.43, 33.09, 31.87 |

Figure 12:
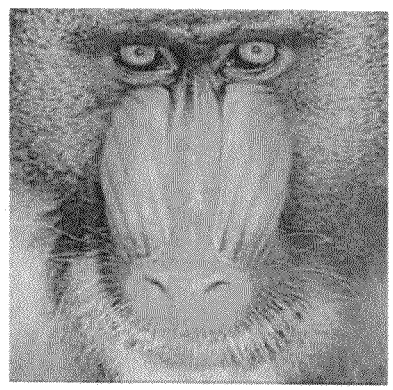
FIGS. 12 (*a*) through (*d*) illustrate comparison of the image encoding and decoding algorithm according to an embodiment of the present invention with that of JPEG2000 in relation to the test image of FIG. 10 (*a*)
Figure 12:
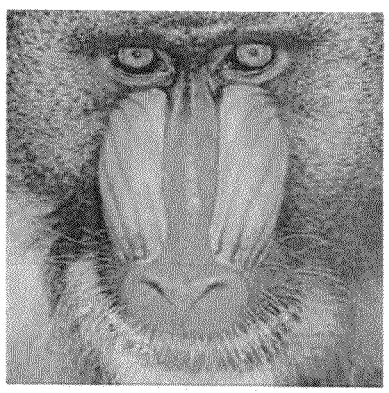
Figure 12:
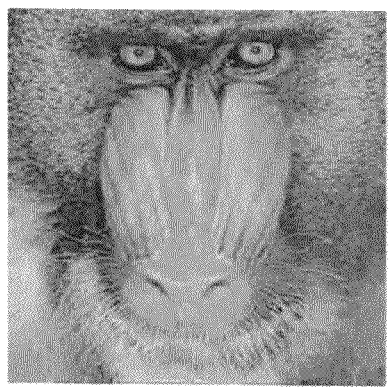
Figure 12:
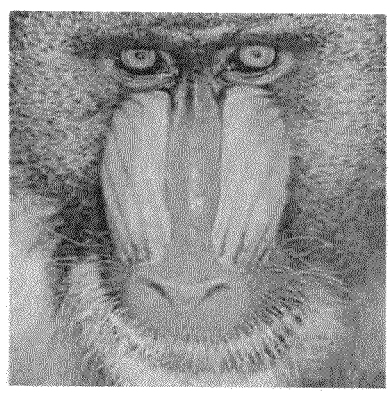
Figure 13:
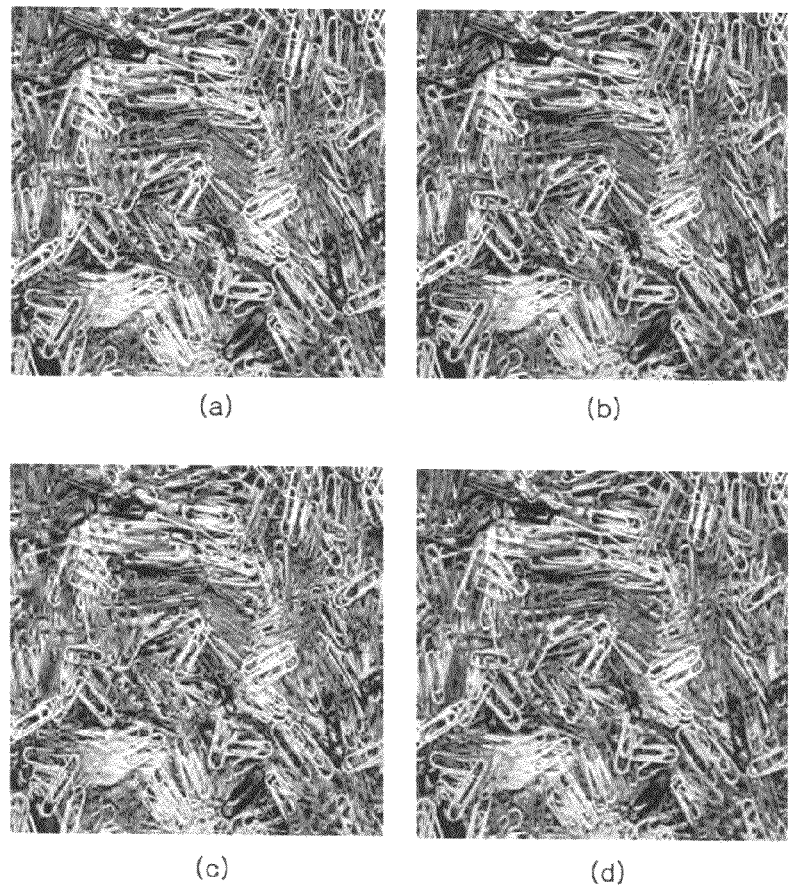
FIGS. 13 (*a*) through (*d*) illustrate comparison of the image encoding and decoding algorithm according to an embodiment of the present invention with that of JPEG2000 in relation to the test image of FIG. 10 (*b*)
Figure 14:
FIGS. 14 (*a*) through (*d*) illustrate comparison of the image encoding and decoding algorithm according to an embodiment of the present invention with that of JPEG2000 in relation to the test image of FIG. 10 (*c*)
Figure 14:
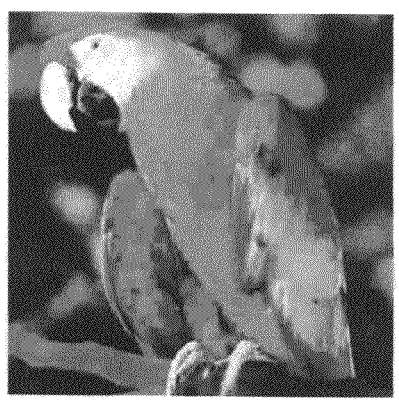
Figure 14:
Figure 14:
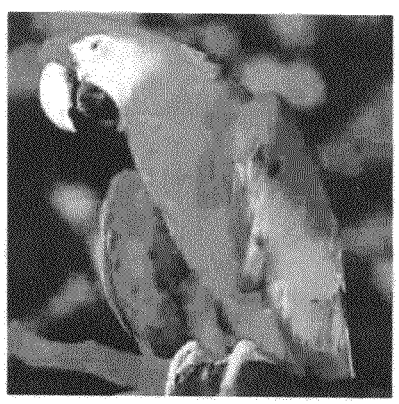
Figure 15:
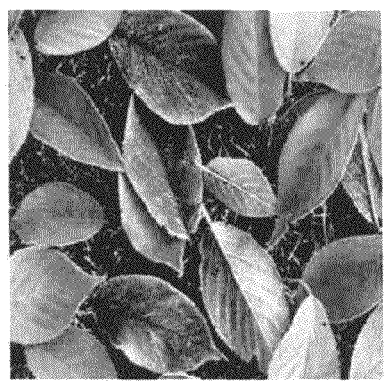
FIGS. 15 (*a*) through (*d*) illustrate comparison of the image encoding and decoding algorithm according to an embodiment of the present invention with that of JPEG2000 in relation to the test image of FIG. 10 (*d*).
Figure 15:
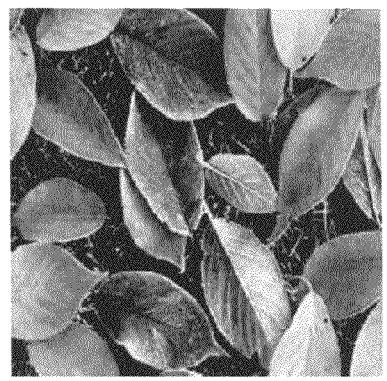
Figure 15:
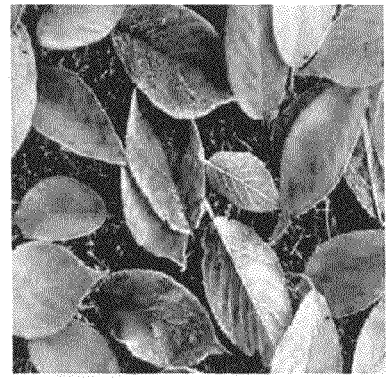
Figure 15:
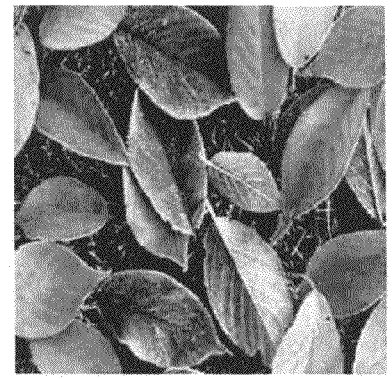

Meanwhile, FIGS. 12 (a) and (c) are images obtained through encoding and decoding at compression ratios of 20:1 and 50:1, respectively, when the present invention was applied to a baboon, and FIGS. 12 (b) and (d) are images obtained through encoding and decoding at compression ratios of 20:1 and 50:1, respectively, when the JPEG2000 was applied to the baboon. FIGS. 13 (a) and (c) are images obtained through encoding and decoding at compression ratios of 20:1 and 50:1, respectively, when the present invention was applied to clips, and FIGS. 13 (b) and (d) are images obtained through encoding and decoding at compression ratios of 20:1 and 50:1, respectively, when the JPEG2000 was applied to the clips. FIGS. 14 (a) and (c) are images obtained through encoding and decoding at compression ratios of 20:1 and 50:1, respectively, when the present invention was applied to a parrot, and FIGS. 14 (b) and (d) are images obtained through encoding and decoding at compression ratios of 20:1 and 50:1, respectively, when the JPEG2000 was applied to the parrot. FIGS. 15(a) and (c) are images obtained through encoding and decoding at compression ratios of 20:1 and 50:1, respectively, when the present invention was applied to leaves, and FIGS. 15(b) and (d) are images obtained through encoding and decoding at compression ratios of 20:1 and 50:1, respectively, when the JPEG2000 was applied to the leaves.

Accordingly, FIGS. 12 through 15 confirm that the images decoded according to the present invention and the JPEG2000 are subjectively identical or similar images.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the present invention, an image is encoded and decoded by using a quantization parameter determined using an allowable noise without any subjective loss such that the encoding efficiency and the subjective picture quality of a restored image can be greatly improved.

Furthermore, an image is quantized with a quantization parameter determined by using an allowable noise without any subjective loss, each coding block is divided into quality layers, and the quantized image is encoded in a scanning order of each quality layer. By doing so, a scalable function is provided and the encoding efficiency and the subjective picture quality of a restored image can be greatly improved.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An image encoding apparatus, comprising:
a computer, comprising:
a transform unit to remove spatial redundancy by transforming an original image;
an allowable noise obtaining unit to obtain an allowable noise, defined as an error image which does not raise subjective loss between the original image and a color quantized image of the original image, by using a result of color quantization of the original image in units of frames or in units of predetermined blocks;
a quantization parameter determination unit to determine a quantization parameter by using the allowable noise;
a quantization unit to generate a quantized coefficient, by quantizing a transform coefficient provided from the transform unit by using the quantization parameter;
a scanning order determination unit to determine a scanning order with respect to quality layers determined using the allowable noise, wherein each of the quality layers comprises bit planes determined by using the allowable noise and the scanning order is from an upper quality layer towards a lower quality layer; and
an entropy encoding unit to entropy encode the quantized coefficient in the scanning order with respect to the quality layers to remove statistical redundancy,
wherein the quantization parameter determination unit determines the quantization parameter of each of coding blocks by gradually increasing the quantization parameter from a smaller value to a bigger value with a predetermined variation step so that a quantization noise generated as a result of quantization with respect to each of the coding blocks can be equal to or less than the allowable noise, and
wherein the scanning order determination unit determines the allowable noise based on a color number and each of the quality layers is determined by using a subsequent allowable noise obtained by a subsequent color number that is less than the color number used to determine the allowable noise.

2. The image encoding apparatus of claim 1, wherein the entropy encoding unit performs bit plane encoding by scanning bits of pixels from a most significant bit to a least significant bit in a scanning line order.

3. The image encoding apparatus of claim 2, wherein the entropy encoding unit performs the bit plane encoding by using a lazy bit.

4. The image encoding apparatus of claim 2, wherein the entropy encoding unit performs the bit plane encoding by predicting a probability value of an arbitrary bit plane.

5. An image encoding method, comprising:
removing spatial redundancy by transforming an original image;
obtaining an allowable noise, defined as an error image which does not raise subjective loss between the original image and a color quantized image of the original image, by using a result of color quantization of the original image in units of frames or in units of predetermined blocks;
determining a quantization parameter by using the allowable noise;
generating a quantized coefficient, by quantizing a transform coefficient by using the quantization parameter;
determining a scanning order with respect to quality layers determined using the allowable noise, wherein each of the quality layers comprises bit planes determined by using the allowable noise and the scanning order is from an upper quality layer towards a lower quality layer; and
entropy encoding the quantized coefficient in the scanning order with respect to the quality layers to remove statistical redundancy,
wherein the determining of the quantization parameter determines the quantization parameter of each of coding blocks by gradually increasing the quantization parameter from a smaller value to a bigger value with a predetermined variation step so that a quantization noise generated as a result of quantization with respect to each of the coding blocks can be equal to or less than the allowable noise, and
wherein the determining of the scanning order comprises determining the allowable noise based on a color number and each of the quality layers is determined by using a subsequent allowable noise obtained by a subsequent color number that is less than the color number used to determine the allowable noise.

6. An image decoding apparatus, comprising:
an entropy decoding unit to generate a quantized coefficient, by entropy decoding a bitstream generated by the apparatus of claim 1;
an inverse quantization unit to generate a transform coefficient, by inverse quantizing the quantized coefficient; and
an inverse transform unit generating a restored image, by inverse transforming the transform coefficient.

7. An image decoding method comprising:
generating a quantized coefficient, by entropy decoding a bitstream generated by the method of claim 5;
generating a transform coefficient, by inverse quantizing the quantized coefficient; and
generating a restored image, by inverse transforming the transform coefficient.

\* \* \* \* \*